Nov. 21, 1961     J. B. HEWETT ET AL     3,009,331
AIR CONDITIONING SYSTEMS
Filed May 5, 1958
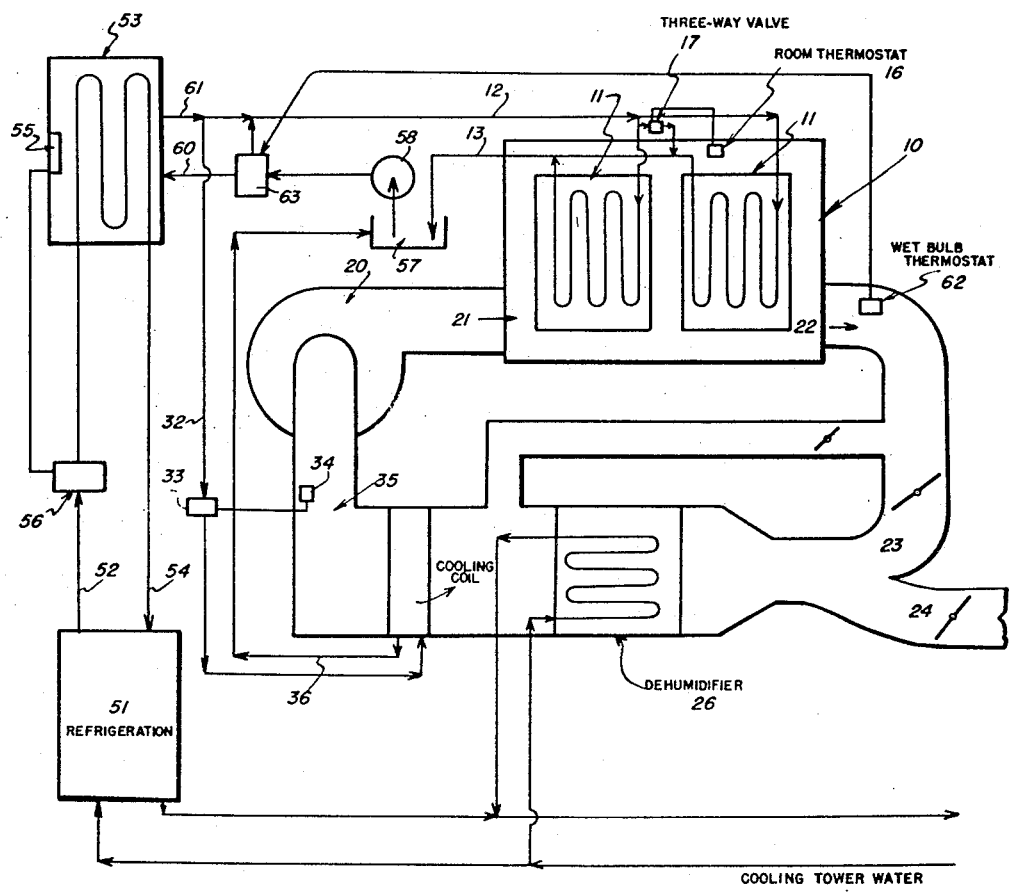
Inventors
John B. Hewett
Elwood A. Windham
By
Edward G. Roe
Attorney

RE 25-1550

3,009,331
AIR CONDITIONING SYSTEMS
John B. Hewett, 64 Buena Vista Drive, Dobbs Ferry, N.Y., and Elwood A. Windham, 782 E. Broad St., Westfield, N.J.
Filed May 5, 1958, Ser. No. 733,200
5 Claims. (Cl. 62—176)

This invention relates to a comfort air conditioning system which employs radiant cooling panels set in the ceiling and/or in the walls of a room or space to be conditioned together with chemically dehumidified and cooled air being supplied to the space for the purpose of eliminating condensation of moisture on the radiant cooling panels, provide ventilation and supplement the cooling effect of the radiant cooling panels.

Many forms of systems using radiant panels in the ceiling and/or walls and some cool air have been designed for conditioning a living or working space. Most of these systems include mechanical refrigeration which cools the air and also cools water which is circulated through the radiant panels. These systems have many disadvantages.

In the first place, the air must be cooled to a very low temperature in order that the dew point in the conditioned space is lower than the temperature of the cooling water being circulated through the radiant panels. This requires refrigeration at a very low temperature which reduces its efficiency. In the second place cost of such a system is greater than a conventional system with no radiant panels.

The object of this invention is to provide a system which embodies the many advantages of radiant cooling and at the same time reduces costs and horsepower requirements.

Another object of this invention is to insure the absence of condensation on the cooled radiant panels under all normal conditions.

The invention includes a plurality of radiant cooling panels set in the walls or ceiling of the space to be conditioned, each of said panels including a system of pipes for circulating of a cooling liquid. These radiant cooling panels absorb the greater part of the sensible heat load in the space by radiant effect. A chemical dehumidifier (employing hygroscopic liquids such as lithium chloride or triethylene glycol, for example) together with a cooling coil is installed in a blower system for dehumidifying and cooling the air and delivering same to the space for the purpose of eliminating condensation on the radiant cooling panels and supplementing the radiant cooling panels by absorbing the balance of the sensible heat load in the space. There is no necessity of direct physical contact between this air and the radiant cooling panels. When well water or city water under 65° F. is not available refrigeration is provided but operating at a relatively high suction temperature which greatly reduces horsepower.

For a better understanding of the present invention, together with other and further objects thereof, reference is made to the following description taken in connection with the accompanying drawings:

The accompanying drawing is a schematic diagram of the system.

Referring to the drawing, the system includes a room 10 to be conditioned and two radiant cooling panels 11 which may be set in the walls or ceiling to form a part of the interior. A large number of panels may be used depending upon the size of the space and cooling loads encountered. The radiant cooling panels are connected by a supply pipe 12 and a discharge pipe 13 although it will be obvious that the pipe connection may be either series or parallel or a combination of both. A thermostat 16 is located in each conditioned zone which controls a by-pass valve 17 or throttling valve which controls the amount of cold water being circulated in the radiant panels.

In order to prevent condensation on the radiant cooling panels and to supplement the radiant cooling, a supply of cool dry air is circulated through room 10 by blower 20 through a system of conduits which enters the room at vent 21 leaving at vent 22. There is no necessity of direct physical contact between this air and the radiant cooling panels. The return air, if any, either mixes with outside air which enters through conduit 24 or by-passes the dehumidifier or both. The blower 20 draws outside air and return air, if any, through the dehumidifier 26 and draws the dehumidified air and any by-passed air over a cooling coil (shown diagrammatically as 27 whereof the pipes are shown as 27$^x$) before being blown into the room. Water for the cooling coil 27 enters from pipe 12 through pipe 32 and returned to storage compartment 57 through pipe 36. The dehumidifier 26 is provided with an internally disposed cooling coil 26$^x$ through which cooling tower water passes.

In order to cool the water to a temperature of 45–65° F. flowing through pipes 12 and 13 refrigeration 51 is employed. This unit sends a liquid refrigerant through pipe 52 into a heat exchanger 53. The refrigerant in gaseous form is returned to the refrigeration unit in pipe 54. In order to control the temperature of the cold water circulating in pipes 12 and 13 a thermostat 55 is employed to control a valve 56 in pipe 52 which controls the amount of liquid refrigerant being supplied to heat exchanger 53.

After the cold water passes through the pipes in panel 11 and pipes of cooling coil 27—it is conveyed to a storage compartment 57 and withdrawn from that compartment by pump 58. Under normal circumstances the pump 58 forces the cooling liquid through pipe 60 into heat exchanger 53 and then out the pipe 61 which joins with pipes 12 and 32.

There may be conditions when the humidity in the conditioned space is at a dew point above the temperature of the normal cold water supply in pipe 12. This is particularly the case immediately after a prolonged shut down such as over week ends. In order to protect the system against the possibility of condensation under these conditions a web bulb thermostat 62 (or dew point stat) is positioned adjacent to the exit vent 22 or, if there is no exit vent, in the conditioned area. Thermostat 62 controls a three way valve 63 which is located to by-pass the heat exchanger 53. When the wet bulb temperature is high the pump 58 circulates the water without sending it through the heat exchanger 53 and prevents condensation from the pipes in panel 11. The dehumidified air entering at 21 reduces the wet bulb temp. As the wet bulb temp. is lowered the thermostat 62 begins to open valve 63 to send some of the water through the heat exchanger 53. When the wet bulb temperature is satisfactory the thermostat 62 will control valve 63 so that all of the water goes through the heat exchanger 53.

Another method when refrigeration is used would be to omit the three way valve 63 and have the thermostat 62 reset the thermostat 55 which controls the temperature of the water.

One example of the considerable saving in horsepower required is set forth below wherein we give comparison data between a conventional system and our new method employing panel cooling and chemical dehumidifying.

Conventional system

Space—20,000 square feet floor area.
Internal sensible load—800,000 B.t.u./hr.
Internal latent load—40,000 B.t.u./hr.
    Fresh Air—6000 c.f.m.—95° F. D.B.—78° F. W.B.
    Total Air—30,000 c.f.m.
    Space 80° F.—45% R.H.

$$\text{Temperature rise in space} = \frac{800,000}{1.08 \times 30,000} = 24.8° \text{ F.}$$

Delivered air:

| | °F. |
|---|---|
| Space | 80 |
| Use | 25 |
| | 55 |

With 55° F. delivered air—assume 45° F. cooling water and +35° F. suction temperature of refrigerant Tonnage:

| | |
|---|---|
| Internal sensible | 800,000 |
| Internal latent | 40,000 |
| Fresh air sensible | 97,200 |
| Fresh air latent | 205,000 |
| Total { B.t.u./hr | 1,142,200 |
| { tons | 95.2 |

95.2 tons at +35° F. suction_____ 100 H.P.

New method—panel cooling and chemical dehumidifying

With 60° F. average water (57.5° to 62.5°) panel cooling will absorb 31 B.t.u./sq. ft./hr.×20,000 sq. ft.= 620,000 B.t.u./hr.

Fresh air leaves dehumidifier at 98° F.—6000 c.f.m.

Use total 12,000 c.f.m.—1/2 return air $$+ 1/2 \text{ fresh air mixture} = \frac{98+80}{2} = 89° \text{ F.}$$

Cooling by air=800,000−620,000=180,000 B.t.u./hr.

$$\frac{180,000}{1.08 \times 12,000} = \frac{80°}{14°} \quad \text{temperature rise} \quad \frac{89°}{66°}$$
$$66°\text{F.} \quad \text{—enter room} \quad 23°$$

Tonnage:

| | |
|---|---|
| Panel cooling | 620,000 |
| Air cooling 12,000×1.08×23° | 300,000 |
| Total { B.t.u./hr | 920,000 |
| { tons | 76.6 |

76.6 tons at +47.5° F. suction_____ 66 H.P.

The combination of radiant cooling panels together with chemical dehumidification and cooling of the air results in less refrigeration tonnage since the latent load is absorbed by the cooling tower or other non-refrigerated water in the chemical dehumidifier. The refrigerated water, being at a higher temperature, requires less horsepower per ton. The combined result shown in this example is a reduction in horsepower of 34%.

Since the radiant cooling panels absorb the greater part of the sensible heat load by radiant effect the total air requirement is greatly reduced and in this example the reduction amounts to 60%, that is, from 30,000 to 12,000 c.f.m. This reduction of air and air handling equipment together with the reduction in horsepower results in reduced costs and operating requirements.

We reserve the right to make such changes and modifications as may come within the scope of the appended claims.

We claim:

1. An air conditioning system for human comfort comprising: an enclosure provided with a plurality of radiant cooling panels provided with pipes for passage therethrough of cooling water, said panel being disposed adjacent a wall of said enclosure, means for sending cooling water through said pipes, means for supplying said cooling water at a temperature in the range of 45 to 65° F., an air blower system for blowing cooled, dehumidified air into the whole of said enclosure, said system comprising a chemical dehumidifier, a cooling coil and a blower, and duct work effecting communication between said enclosure and said blower system.

2. An air conditioning system for human comfort in accordance with claim 1, including means for controlling the temperature of the cooling water passing through the radiant cooling panels.

3. An air conditioning system for human comfort in accordance with claim 2, wherein said means for controlling the temperature includes a dewpoint thermostat disposed in said blower system adjacent an exit vent in said enclosure.

4. An air conditioning system for human comfort comprising: an enclosure provided with a plurality of radiant cooling panels, said cooling panels having pipes for passage therethrough of cooling water, said panels constituting a part of a wall of said enclosure, means for passing the cooling water through said panels at a temperature of 45–65° F.; means for refrigerating said cooling water to a temperature of 45–65° F.; an air blower system for blowing cooled dehumidified air into the whole of said enclosure, said system comprising a chemical dehumidifier, a coil for cooling dehumidified air, means for sending cooling water through said coil and the aforementioned refrigerating means, and a blower; and duct work effecting communication between said enclosure and said blower system.

5. An air conditioning system for human comfort comprising: an enclosure provided with a plurality of radiant cooling panels provided with pipes for passage therethrough of cooling water, said panels constituting a part of a wall of said enclosure, means for sending cooling water through said pipes at a temperature of 45–65° F., an air blower system for blowing cool, dehumidified air into the whole of said enclosure, said system comprising a chemical dehumidifier, a cooling coil and a blower, and duct work effecting communication between said enclosure and said blower system.

References Cited in the file of this patent
UNITED STATES PATENTS

| | | |
|---|---|---|
| 2,009,529 | Simonds | July 30, 1935 |
| 2,019,291 | Brace | Oct. 29, 1935 |
| 2,060,589 | Otto | Nov. 10, 1936 |
| 2,143,188 | Coulter | Jan. 10, 1939 |
| 2,256,940 | Crawford | Sept. 23, 1941 |
| 2,257,485 | Sewell | Sept. 30, 1941 |
| 2,392,240 | Frankel | Jan. 1, 1946 |
| 2,416,354 | Shoemaker | Feb. 25, 1947 |
| 2,425,775 | Yarborough | Aug. 19, 1947 |
| 2,660,409 | Pittenger | Nov. 24, 1953 |
| 2,690,656 | Cummings | Oct. 5, 1954 |
| 2,971,350 | Mills | Feb. 14, 1961 |